(12) United States Patent
Wang et al.

(10) Patent No.: US 11,855,752 B2
(45) Date of Patent: Dec. 26, 2023

(54) METHOD FOR PUSHING INFORMATION, METHOD AND APPARATUS FOR CONTROLLING PRESENTATION OF CONTENT

(71) Applicant: Baidu Online Network Technology (Beijing) Co., Ltd., Beijing (CN)

(72) Inventors: Yue Wang, Beijing (CN); Zelin Wu, Beijing (CN); Jingjing Xue, Beijing (CN); Yingnan Liu, Beijing (CN); Wenlong Rao, Beijing (CN); Zijie Wang, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 594 days.

(21) Appl. No.: 17/025,690

(22) Filed: Sep. 18, 2020

(65) Prior Publication Data
US 2021/0006343 A1 Jan. 7, 2021

Related U.S. Application Data

(63) Continuation of application No. PCT/CN2019/096737, filed on Jul. 19, 2019.

(30) Foreign Application Priority Data

Nov. 28, 2018 (CN) .......................... 201811433500.9

(51) Int. Cl.
*H04H 20/62* (2008.01)
*B60W 60/00* (2020.01)
(Continued)

(52) U.S. Cl.
CPC ............. *H04H 20/62* (2013.01); *B60K 35/00* (2013.01); *B60W 60/001* (2020.02);
(Continued)

(58) Field of Classification Search
CPC .. H04N 21/218; G05D 1/0088; G05D 1/0276; H04H 20/62; B60W 60/001; B60K 35/00
See application file for complete search history.

(56) References Cited

U.S. PATENT DOCUMENTS

2015/0330805 A1 11/2015 Cho
2016/0327399 A1* 11/2016 Ronnang ................. H04W 4/40
(Continued)

FOREIGN PATENT DOCUMENTS

CN   104019825 A   9/2014
CN   104750685 A   7/2015
(Continued)

OTHER PUBLICATIONS

International Search Report in International Application No. PCT/CN2019/096737 dated Oct. 22, 2019 (4 pages).
(Continued)

*Primary Examiner* — Randy A Flynn
(74) *Attorney, Agent, or Firm* — Ice Miller LLP

(57) ABSTRACT

Embodiments of the present disclosure disclose a method and an apparatus for pushing information, a method and an apparatus for controlling presentation of content. The method for pushing information includes: determining vehicle information of a communicatively connected autonomous vehicle, the vehicle information including autonomous vehicle driving route information; selecting to-be-played content matching the vehicle information from a pre-stored set of to-be-played contents according to the vehicle information, and storing the elected to-be-played content to the sub-set of to-be-played contents; and transmitting the sub-set of to-be-played contents to the autonomous vehicle so that the autonomous vehicle plays the to-be-played content in the sub-set of to-be-played contents.
(Continued)

According to the embodiment, targeted to-be-played content can be sent to the autonomous vehicle.

14 Claims, 4 Drawing Sheets

(51) Int. Cl.
    *B60K 35/00*       (2006.01)
    *G05D 1/00*        (2006.01)
    *G05D 1/02*        (2020.01)
    *H04N 21/218*    (2011.01)

(52) U.S. Cl.
    CPC ......... *G05D 1/0088* (2013.01); *G05D 1/0276* (2013.01); *H04N 21/218* (2013.01)

(56) References Cited

U.S. PATENT DOCUMENTS

| | | |
|---|---|---|
| 2016/0364823 A1 | 12/2016 | Cao |
| 2017/0330034 A1 | 11/2017 | Quan et al. |
| 2017/0341513 A1* | 11/2017 | Wu ................... G01C 21/3697 |
| 2018/0192285 A1* | 7/2018 | Schmidt ................ H04W 4/48 |
| 2019/0197430 A1* | 6/2019 | Arditi ................... G06N 20/00 |

FOREIGN PATENT DOCUMENTS

| | | |
|---|---|---|
| CN | 105245956 A | 1/2016 |
| CN | 105717945 A | 6/2016 |
| CN | 105844936 A | 8/2016 |
| CN | 105868330 A | 8/2016 |
| CN | 106052702 A | 10/2016 |
| CN | 106254016 A | 12/2016 |
| CN | 107091649 A | 8/2017 |
| CN | 108765762 A | 11/2018 |
| CN | 109525585 A | 3/2019 |
| JP | 2017204261 A | 11/2017 |
| JP | 2017211359 A | 11/2017 |
| WO | 2017095852 A1 | 6/2017 |

OTHER PUBLICATIONS

Extended European Search Report in European Patent Application No. 19890329.6, dated Jul. 15, 2021 (11 pages).

\* cited by examiner

METHOD FOR PUSHING INFORMATION, METHOD AND APPARATUS FOR CONTROLLING PRESENTATION OF CONTENT

CROSS-REFERENCE TO RELATED APPLICATIONS

This patent application is a continuation of International Application No. PCT/CN2019/096737, filed on Jul. 19, 2019, which claims priority to Chinese Patent Application No. 201811433500.9, filed on Nov. 28, 2018, titled "Method for Pushing Information, Method and Apparatus for Controlling Presentation of Content," applicant of which is Baidu Online Network Technology (Beijing) Co., Ltd.. The disclosures of the aforementioned applications are hereby incorporated by reference in their entireties.

TECHNICAL FIELD

Embodiments of the present disclosure relate to the field of computer technology, and more particularly, to a method and apparatus for pushing information, a method and an apparatus for controlling presentation of content.

BACKGROUND

An autonomous vehicle is an intelligent vehicle that senses a road environment through an on-board sensing system, automatically plans a driving route, and controls the vehicle to reach a predetermined target. During the traveling of the autonomous vehicle, there is a need to play content such as audio and video in an autonomous vehicle in order to avoid a too-monotonous journey of passengers in the vehicle and to enliven the atmosphere in the autonomous vehicle.

SUMMARY

Embodiments of the present disclosure provide a method and an apparatus for pushing information, a method and an apparatus for controlling presentation of content.

According to a first aspect, an embodiment of the present disclosure provides a method for pushing information, the method including determining vehicle information of a communicatively connected autonomous vehicle, the vehicle information including autonomous vehicle driving route information; selecting to-be-played content matching the vehicle information from the pre-stored set of to-be-played contents according to the vehicle information, and storing the selected to-be-played content to a sub-set of to-be-played contents; and transmitting the sub-set of to-be-played contents to the autonomous vehicle so that the autonomous vehicle plays the to-be-played content in the sub-set of to-be-played contents.

In some embodiments, the vehicle information further includes vehicle type information; and the determining vehicle information of a communicatively connected autonomous vehicle includes receiving route formulation request information of the autonomous vehicle, where the route formulation request information includes autonomous vehicle identification information, start point information, and end point information of the autonomous vehicle; determining autonomous vehicle type information of the autonomous vehicle according to the autonomous vehicle identification information, and determining autonomous vehicle driving route information of the autonomous vehicle according to the start point information and the end point information.

In some embodiments, the autonomous vehicle driving route information includes a set of autonomous vehicle station information corresponding to at least one autonomous station point, and to-be-played content in the set of to-be-played content is associated with station information and vehicle type information.

In some embodiments, the selecting to-be-played content matching the vehicle information from the pre-stored set of to-be-played contents according to the vehicle information, and storing the selected to-be-played content to the sub-set of to-be-played contents include finding at least one to-be-played content matching the autonomous vehicle type information from the set of to-be-played contents according to the autonomous vehicle type information; and for the autonomous vehicle station information in the autonomous vehicle station information set, selecting to-be-played content matching the autonomous vehicle station information from at least one to-be-played content, and storing the selected to-be-played content to the sub-set of to-be-played contents.

In a second aspect, an embodiment of the present disclosure provides a method for controlling presentation of content, the method including: obtaining a current position coordinate of an autonomous vehicle; in response to determining that a distance value smaller than a distance threshold is included in the distance value between the current position coordinate and the preset at least one position coordinate, selecting a to-be-played content from a sub-set of to-be-played content for content presentation by a presentation device, where the sub-set of to-be-played content is received from a communicatively connected server and is transmitted by the server by: determining vehicle information of the autonomous vehicle;

selecting to-be-played content matching the vehicle information from a pre-stored set of to-be-played contents according to the vehicle information, and storing the selected to-be-played content to the set of to-be-played contents; and transmitting the sub-set of to-be-played content.

According to a third aspect, an embodiment of the present disclosure provides an apparatus for pushing information, the apparatus comprising: an information determining unit configured to determine vehicle information of a communicatively connected autonomous vehicle, the vehicle information including autonomous vehicle driving route information; an information storage unit configured to select to-be-played content matching the vehicle information from a pre-stored set of to-be-played contents according to the vehicle information, and store the selected to-be-played content to a sub-set of to-be-played contents; an information transmitting unit configured to transmit the sub-set of to-be-played contents to the autonomous vehicle so that the autonomous vehicle plays the to-be-played content in the sub-set of to-be-played contents.

In some embodiments, the vehicle information further includes vehicle type information; and the information determining unit is further configured to: receive routing formulation request information of the autonomous vehicle, the routing request information including autonomous vehicle identification information, start point information, and end point information of the autonomous vehicle; and determining autonomous vehicle type information of the autonomous vehicle according to the autonomous vehicle identification information, and determining autonomous vehicle driving route information of the autonomous vehicle according to the start point information and the end point information.

In some embodiments, the autonomous vehicle driving route information includes a set of autonomous vehicle station information corresponding to at least one autonomous station, and the to-be-played content in the set of to-be-played content is associated with station information and vehicle type information.

In some embodiments, the information storage unit is further configured to find at least one to-be-played content matching the autonomous vehicle type information from the set of to-be-played content according to the autonomous vehicle type information; and for the autonomous vehicle station information in the autonomous vehicle station information set, selecting to-be-played content matching the autonomous vehicle station information from at least one the to-be-played content, and storing the selected to-be-played content to the sub-set of to-be-played contents.

In a fourth aspect, an embodiment of the present disclosure provides a server including one or more processors; a storage apparatus on which one or more programs are stored; when one or more programs are executed by one or more processors, one or more processors are caused to implement the method as described in any of embodiments of the first aspect.

According to a fifth aspect, an embodiment of the present disclosure provides an apparatus for controlling presentation of content, the apparatus including: a position acquiring unit configured to acquire a current position coordinate of an autonomous vehicle; a content selection unit configured to, in response to determining that a distance value smaller than a distance threshold is included in the distance value between the current position coordinate and the preset at least one position coordinate, select a to-be-played content from a sub-set of to-be-played content for content presentation by a presentation device, where the sub-set of to-be-played content is received from a communicatively connected server and is transmitted by the server by: determining vehicle information of the autonomous vehicle; selecting to-be-played content matching the vehicle information from a pre-stored set of to-be-played contents according to the vehicle information, and storing the selected to-be-played content to the set of to-be-played contents; and transmitting the sub-set of to-be-played contents.

In a sixth aspect, an embodiment of the present disclosure provides a controller including one or more processors; a storage apparatus on which one or more programs are stored; when one or more programs are executed by one or more processors, one or more processors are caused to implement the method as described in any of embodiments of the second aspect.

In a seventh aspect, an embodiment of the present disclosure provides an autonomous vehicle including a controller as described in the sixth aspect.

In an eighth aspect, an embodiment of the present disclosure provides a computer readable medium storing a computer program which, when executed by a processor, implements the method as described in any one of the first aspect or the second aspect.

The method and apparatus for pushing information provided in the embodiments of the present disclosure can determine vehicle information of a communicatively connected autonomous vehicle. The vehicle information includes autonomous vehicle driving route information. Then, based on the vehicle information, the to-be-played content matching the vehicle information is selected from the pre-stored to-be-played content set, and stored in the to-be-played content sub-set. Finally, the sub-set of to-be-played content is transmitted to the autonomous vehicle so that the autonomous vehicle plays the to-be-played content in the sub-set of to-be-played content. According to the method and apparatus of the present embodiment, the autonomous vehicle driving route information of the autonomous vehicle is used to select the to-be-played content from the pre-stored set of to-be-played content, so that the to-be-played content can be transmitted to the autonomous vehicle.

BRIEF DESCRIPTION OF THE DRAWINGS

Other features, objects, and advantages of the present disclosure will become more apparent by reading the detailed description of non-limiting embodiments made with reference to the following drawings.

DETAILED DESCRIPTION OF EMBODIMENTS

The present disclosure is described in further detail below with reference to the accompanying drawings and examples. It is to be understood that the specific embodiments described herein are merely illustrative of the relevant disclosure and are not intended to limit the disclosure. It should also be noted that, for ease of description, only parts of the drawings relating to the relevant disclosure are shown.

It should be noted that the embodiments in the present disclosure and the features in the embodiments may be combined with each other without conflict. The present disclosure will now be described in detail with reference to the accompanying drawings and examples.

Figure 1:
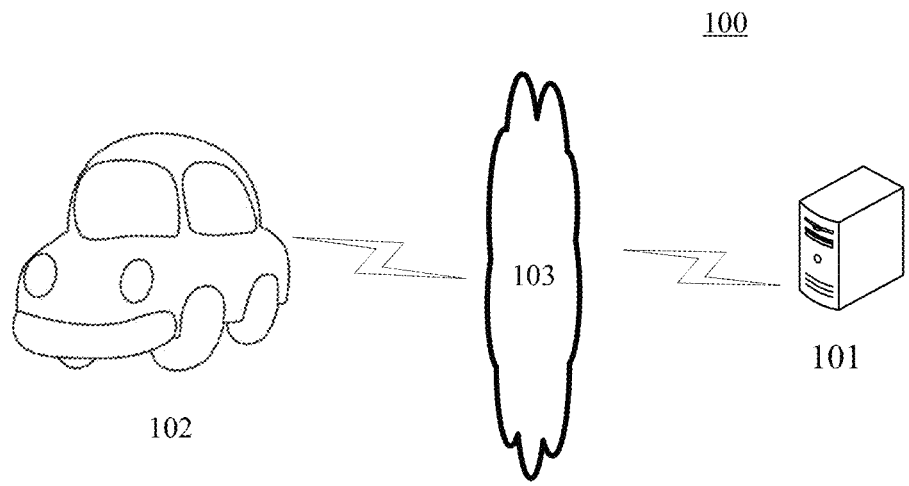
FIG. 1 is a diagram of an example system architecture in which an embodiment of the present disclosure may be applied.

FIG. 1 illustrates an example system architecture 100 in which a method for pushing information or an apparatus for pushing information of an embodiment of the present disclosure may be applied.

As shown in FIG. 1, the system architecture 100 may include a server 101, an autonomous vehicle 102, and a network 103. The network 103 serves as a medium for providing a communication link between the server 101 and the autonomous vehicle 102. The network 103 may include various types of connections, such as wired, wireless communication links, or fiber optic cables, etc.

The server 101 may be a server that provides various services, such as a cloud server that sends a sub-set of to-be-played content to the autonomous vehicle 102. The cloud server may determine autonomous vehicle driving route information and autonomous vehicle type information for the communicatively connected autonomous vehicle 102. Then, based on the vehicle information, the to-be-played content matching the vehicle information is selected from the pre-stored set of to-be-played content, and stored in the sub-set of to-be-played content. Thereafter, the sub-set of to-be-played contents is transmitted to the autonomous vehicle 102 so that the autonomous vehicle 102 plays the to-be-played content in the sub-set of to-be-played contents.

It should be noted that the server may be hardware or software. When the server is hardware, the server may be implemented as a cluster of multiple distributed servers, or a single server. When the server is software, it may be implemented as a plurality of software pieces or software modules (e.g., for providing distributed services), or it may be implemented as a single software piece or software module, which is not specifically limited herein.

The autonomous vehicle 102 may interact with the server 101 via the network 103 to receive or send messages or the like. Various communication client applications, such as instant messaging tools, mailbox clients, and the like, may be installed on the autonomous vehicle 102. The autonomous vehicle 102 may be an autonomous vehicle capable of self-driving.

It should be noted that the method for pushing information in the embodiment of the present disclosure is generally performed by the server 101, and accordingly, the apparatus for pushing information is generally arranged in the server 101.

It should be understood that the number of autonomous vehicles, networks and servers in FIG. 1 is merely illustrative. There may be any number of autonomous vehicles, networks, and servers based on actual needs.

Figure 2:
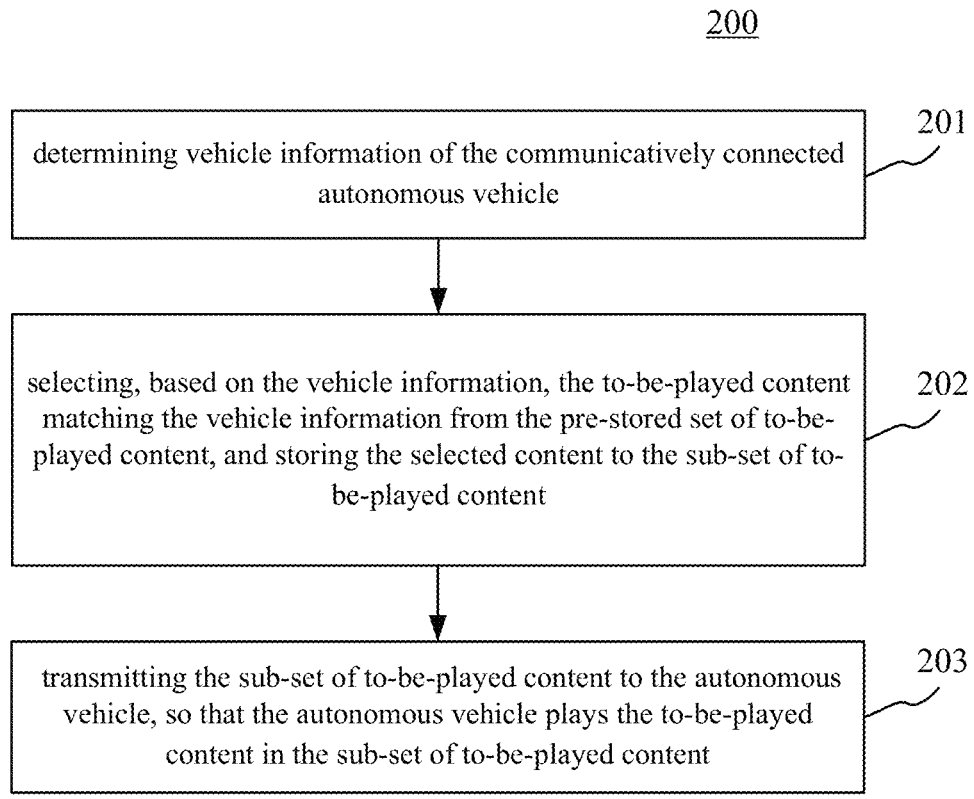
FIG. 2 is a flowchart of an embodiment of a method for pushing information according to the present disclosure.

With continuing reference to FIG. 2, a flow 200 of an embodiment of a method for pushing information according to the present disclosure is shown. The method for pushing information includes the following steps.

Step 201 includes determining vehicle information of the communicatively connected autonomous vehicle.

In the present embodiment, the execution body of the method for pushing information (for example, the server 101 shown in FIG. 1) may determine vehicle information of the communicatively connected autonomous vehicle. The vehicle information includes autonomous vehicle driving route information. The autonomous vehicle driving route information may be a set of at least one position coordinate that can be connected to form a driving route of the autonomous vehicle. As an example, the autonomous vehicle driving route information may be {L1, L2, L3, L4}. L1, L2, L3, and L4 are all position coordinates. It should be noted that when the autonomous vehicle driving route information is {L1, L2, L3, L4}, the formed autonomous vehicle route may be L1-L2-L3-L4.

In the present embodiment, the execution body may determine the vehicle information of the autonomous vehicle as follows. First, a play content acquisition request sent by the communicatively connected autonomous vehicle is received. The play content acquisition request includes autonomous vehicle driving route information and autonomous vehicle identification information. Then, the autonomous vehicle driving route information in the acquired play content acquisition request is determined as the autonomous vehicle driving route information of the autonomous vehicle.

In some alternative implementations of the present embodiment, the vehicle information further includes vehicle type information. In this case, the execution body may alternatively determine the vehicle information of the autonomous vehicle as follows.

In a first step, route making request information of an autonomous vehicle is received, and the route making request information includes autonomous vehicle identification information, start point information, and end point information of the autonomous vehicle.

In the present embodiment, the start point information may be various information for characterizing the start point of the route. The endpoint information may be various information for characterizing the endpoint of the route. Alternatively, the start point information may be a position coordinate of the start point, and the end point information may be a position coordinate of the end point.

Second, the autonomous vehicle type information of the autonomous vehicle is determined based on the autonomous vehicle identification information, and the autonomous vehicle driving route information of the autonomous vehicle is determined based on the start point information and the end point information. Here, the above-mentioned autonomous vehicle type information may be various information for characterizing the vehicle type of the autonomous vehicle. As an example, the above-mentioned autonomous vehicle type information may be a character group "bus", which is used for indicating that the vehicle type of the autonomous vehicle is a bus. The autonomous vehicle identification information may be various information for characterizing the autonomous vehicle identity. By way of example, the autonomous vehicle identification information may be number "1", which is used for representing that the identity of the autonomous vehicle is the vehicle with number 1.

In the present embodiment, the execution body may find the autonomous vehicle type of the autonomous vehicle from the pre-established correspondence table between identifications and vehicle types using the autonomous vehicle identification. Here, the correspondence table between identifications and vehicle types may be a correspondence table established in advance based on statistics of a large number of identifications and vehicle types, in which a plurality of identifications and vehicle types are stored.

In the present embodiment, the execution body can use the start point information and the end point information to find the autonomous vehicle driving route information from the pre-established correspondence table between start points and routes. The correspondence table between start points and routes may be a correspondence table established in advance by a technician based on statistics of a large quantity of start point information, end point information, and route information, in which a plurality of correspondence relationships between start point information, end point information, and route information are stored. The execution body may calculate the autonomous vehicle driving route information by using the start point information, the end point information, and the path planning algorithm. Here, the path planning algorithm may be the Dijkstra algorithm, A-star algorithm, or another algorithm for planning a path between a start point and an end point.

Step 202 includes selecting, based on the vehicle information, the to-be-played content matching the vehicle information from the pre-stored set of to-be-played content, and storing the selected content to the sub-set of to-be-played content.

The to-be-played content in the pre-stored set of to-be-played content may be audio, video, or other form of content that can be played. It should be noted that the sub-set of to-be-played content may be an empty set before the to-be-played content is stored.

In the present embodiment, the execution body can obtain the sub-set of the to-be-played content as follows. First, the number of the to-be-played content corresponding to the autonomous vehicle driving route information is found from the pre-stored association information table using the autonomous vehicle driving route information. Then, the set of to-be-played content is searched for the to-be-played content according to the found number of the to-be-played content, and the found content is stored in the sub-set of to-be-played content. The association information table may be a correspondence relationship table prepared in advance by a technician based on statistics of a large quantity of driving route information and the number of the to-be-played content, in which a plurality of correspondence relationships between the driving route information and the numbers of the to-be-played content are stored.

In some alternative implementations of the present embodiment, the vehicle information further includes vehicle type information. The autonomous vehicle driving route information includes an autonomous vehicle station information set corresponding to at least one autonomous station, and the to-be-played content in the set of to-be-played contents is associated with station information and vehicle type information, and selecting, based on the vehicle information, the to-be-played content matching the vehicle information from the pre-stored set of to-be-played content, and storing the selected content in the sub-set of to-be-played content includes: finding at least one to-be-played content matching the autonomous vehicle type information from the set of to-be-played contents according to the autonomous vehicle type information; for the autonomous vehicle station information in the autonomous vehicle station information set, selecting a to-be-played content matching the autonomous vehicle station information from at least one to-be-played content, and storing the selected to-be-played content to the sub-set of to-be-played contents.

In the present embodiment, the autonomous vehicle station may be a position point preset by a technician. The autonomous vehicle station information may include, but is not limited to, a station name and station location coordinates.

In the present embodiment, the execution body may further obtain the sub-set of to-be-played content as follows.

In the first step, the autonomous vehicle type information is used to select the to-be-played content in the content set to be played. Here, the autonomous vehicle type information is compared with each to-be-played content in the set of to-be-played contents, and if the vehicle type information associated with the to-be-played content matches the autonomous vehicle type information, the to-be-played content is selected. In this way, at least one to-be-played content can be obtained. The vehicle type information associated with the to-be-played content matching the vehicle type information of the autonomous vehicle, may refer to that they are identical or corresponding. As an example, if the vehicle type information associated with the to-be-played content is the character "B" and the autonomous vehicle type information is the character group "bus", the vehicle types represented by the character "B" and the character group "bus" are both bus, then it may be considered that the vehicle type information associated with the to-be-played content corresponds to the autonomous vehicle type information. In this case, the vehicle type information associated with the to-be-played content matches the autonomous vehicle type information.

In the second step, at least one to-be-played content obtained in the first step is further selected by using the autonomous vehicle station information in the autonomous vehicle station information set. Here, each piece of autonomous vehicle station information in the autonomous vehicle station information set is compared with the obtained at least one to-be-played content. A to-be-played content whose associated station information matches the autonomous vehicle station information is selected from at least one to-be-played content and stored in a set of to-be-played contents.

Step 203 includes transmitting the sub-set of to-be-played content to the autonomous vehicle, so that the autonomous vehicle plays the to-be-played content in the sub-set of to-be-played content.

In the present embodiment, the execution body may transmit the sub-set of to-be-played content to the autonomous vehicle through a wired connection mode or a wireless connection mode.

Figure 3:
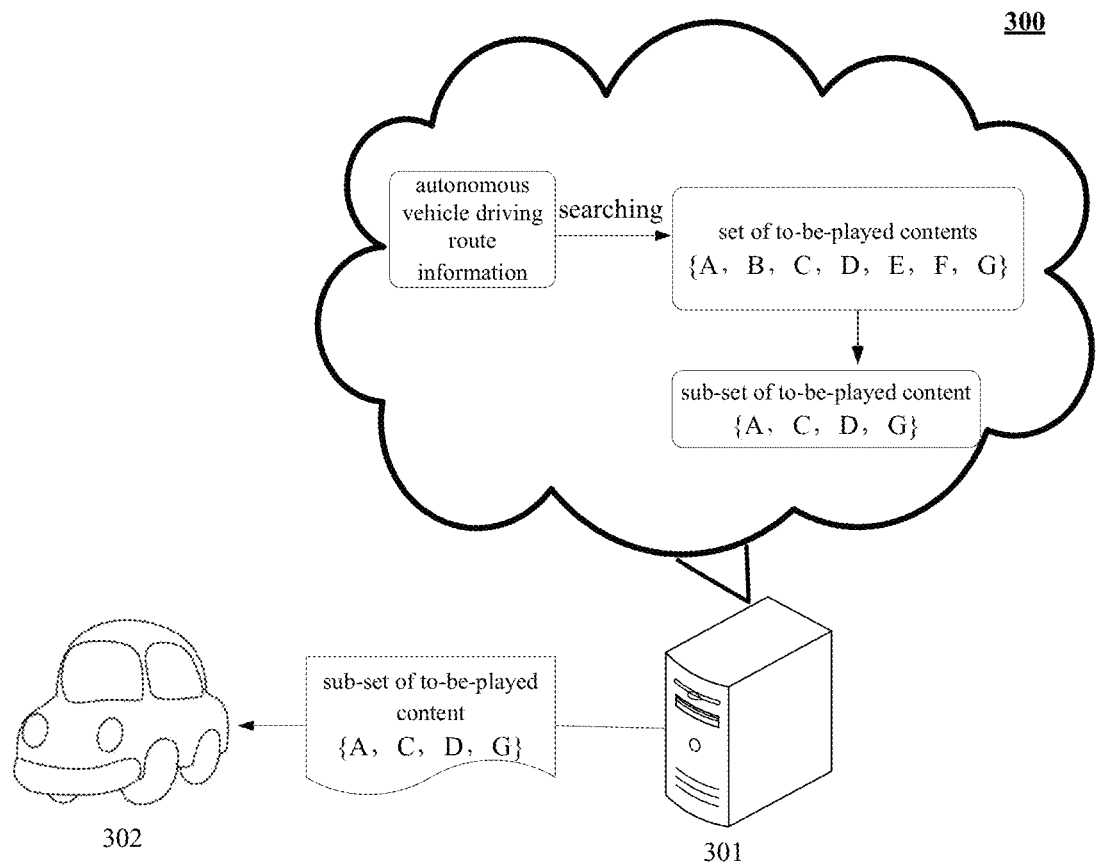
FIG. 3 is a schematic diagram of an application scenario of a method for pushing information according to an embodiment of the present disclosure.

With continued reference to FIG. 3, FIG. 3 is a schematic diagram of an application scenario of a method for pushing information according to the present embodiment. In the application scenario 300 shown in FIG. 3, first, the server 301 determines autonomous vehicle driving route information of the communicatively connected autonomous vehicle 302. Then, the server 301 selects the to-be-played contents A, C, D, and G that match the autonomous vehicle driving route information from the pre-stored set of to-be-played contents {A, B, C, D, E, F, and G} according to the autonomous vehicle driving route information, and stores the selected content to the sub-set of to-be-played content, thereby obtaining the sub-set of to-be-played contents as {A, C, D, and G}. Finally, the sub-set of to-be-played contents {A, C, D, G} is transmitted to the autonomous vehicle 302 so that the autonomous vehicle 302 plays the to-be-played contents in the sub-set of to-be-played contents {A, C, D, G}.

In the method for pushing information according to embodiments of the disclosure, vehicle information of a communicatively connected autonomous vehicle may be determined. The vehicle information includes autonomous vehicle driving route information. Then, based on the vehicle information, the to-be-played content matching the vehicle information is selected from the pre-stored set of to-be-played contents, and stored in the sub-set of to-be-played contents. Finally, the sub-set of to-be-played contents is transmitted to the autonomous vehicle so that the autonomous vehicle plays the to-be-played content in the sub-set of to-be-played contents. According to the method of the present embodiment, the autonomous vehicle driving route information of the autonomous vehicle is used to select the to-be-played content from the pre-stored set of to-be-played contents, so that the targeted to-be-played content can be transmitted to the autonomous vehicle.

Figure 4:
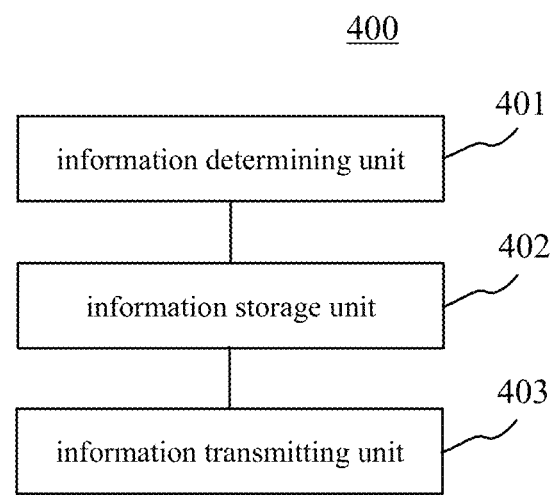
FIG. 4 is a schematic structural diagram of an embodiment of an apparatus for pushing information according to the present disclosure.

With further reference to FIG. 4, as an implementation of the method shown in each of the above figures, the present disclosure provides an embodiment of an apparatus for pushing information, which corresponds to the method embodiment shown in FIG. 2 and which is particularly applicable to various servers.

As shown in FIG. 4, the apparatus 400 for pushing information according to the present embodiment includes an information determining unit 401 configured to determine vehicle information of a communicatively connected autonomous vehicle, the vehicle information including autonomous vehicle driving route information. The information storage unit 402 is configured to select to-be-played content matching the vehicle information from a pre-stored set of to-be-played contents based on the vehicle information, and store the selected to-be-played content to a sub-set of to-be-played contents. The information transmitting unit 403 is configured to transmit the sub-set of to-be-played contents to the autonomous vehicle so that the autonomous vehicle plays the to-be-played content in the sub-set of to-be-played contents.

In some alternative implementations of the present embodiment, the vehicle information further includes vehicle type information, and the information determining unit 401 may be further configured to first receive route making request information of the autonomous vehicle, the route making request information including autonomous vehicle identification information, start point information, and end point information of the autonomous vehicle. Then, the autonomous vehicle type information of the autonomous vehicle is determined based on the autonomous vehicle identification information, and the autonomous vehicle driving route information of the autonomous vehicle is determined based on the start point information and the end point information.

In some alternative implementations of the present embodiment, the autonomous vehicle driving route information includes a set of autonomous vehicle station information corresponding to at least one autonomous station, and the to-be-played content in the set of to-be-played content is associated with station information and vehicle type information.

In some alternative implementations of the present embodiment, the information storage unit 402 is further configured to find at least one to-be-played content matching the autonomous vehicle type information from the set of to-be-played contents according to the autonomous vehicle type information; for the autonomous vehicle station information in the autonomous vehicle station information set, select the to-be-played content matching the autonomous vehicle station information from at least one to-be-played content, and storing the selected to-be-played content to the sub-set of to-be-played contents.

According to the apparatus provided in the above-described embodiment of the present disclosure, the information determining unit 401 determines vehicle information of an communicatively connected autonomous vehicle, the vehicle information including autonomous vehicle driving route information. Then, the information storage unit 402 selects the to-be-played content matching the vehicle information from the pre-stored set of to-be-played contents based on the vehicle information, and stores the selected the to-be-played content to the sub-set of to-be-played contents. Finally, the information transmitting unit 403 transmits the sub-set of to-be-played contents to the autonomous vehicle so that the autonomous vehicle plays the to-be-played content in the sub-set of to-be-played contents. According to the apparatus of the present embodiment, the autonomous vehicle driving route information of the autonomous vehicle is used to select the to-be-played content from the pre-stored set of to-be-played contents, so that the targeted to-be-played content can be transmitted to the autonomous vehicle.

Figure 5:
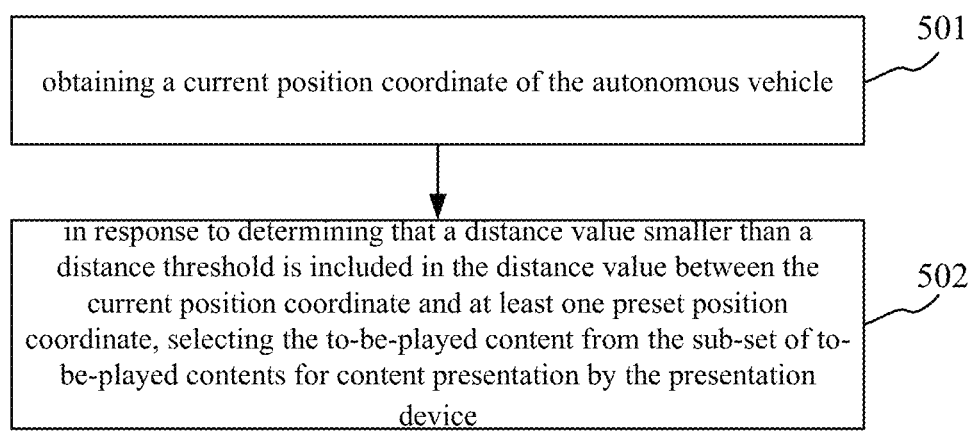
FIG. 5 is a flowchart of an embodiment of a method for controlling presentation of content according to the present disclosure.

With further reference to FIG. 5, a flow 500 of an embodiment of a method for controlling the presentation of content is shown as a complementary implementation of the methods shown in the above figures. The flow 500 of the method for controlling the presentation of content includes the following steps.

Step 501 includes: obtaining a current position coordinate of the autonomous vehicle.

In the present embodiment, the execution body of the method for controlling the presentation of the content may be a controller for controlling an autonomous vehicle. The execution body may acquire the current position coordinates of the autonomous vehicle through a Global Positioning System (GPS), or may acquire the current position coordinates of the autonomous vehicle through other means.

Step 502 includes in response to determining that a distance value smaller than a distance threshold is included in the distance value between the current position coordinate and at least one preset position coordinate, selecting the to-be-played content from the sub-set of to-be-played contents for content presentation by the presentation device.

The sub-set of to-be-played contents is received from a communicatively connected server and the transmission of the sub-set of content by the server includes: determining vehicle information of an autonomous vehicle; selecting to-be-played content matching the vehicle information from the pre-stored set of to-be-played contents according to the vehicle information, and storing the selected to-be-played content to the sub-set of to-be-played contents; and transmitting the sub-set of to-be-played contents.

In the present embodiment, the execution body may receive the sub-set of to-be-played contents transmitted by the server based on the autonomous vehicle driving route information and the autonomous vehicle type information through the wired connection or the wireless connection. Thereafter, the execution body may store the received sub-set of to-be-played contents in the autonomous vehicle so that the autonomous vehicle can play the to-be-played content in the to-be-played content sub-set each time the autonomous vehicle travels on the road indicated by the autonomous vehicle driving route information.

In the present embodiment, the execution body may determine that there is a distance value smaller than the distance threshold in the distance value between the current position coordinate and at least one preset position coordinate by: selecting the position coordinate from the at least one position coordinate for the at least one preset position coordinate, and perform the determining step of calculating the distance value between the selected position coordinate and the current position coordinate, and if the distance value is smaller than the distance threshold, determine that there is a distance value smaller than the distance threshold in the distance value between the current position coordinate and the at least one preset position coordinate. Otherwise, an unselected position coordinate is selected from the at least one position coordinate, to continue performing the above determination step. Here, the distance value between the selected position coordinate and the current position coordinate may be calculated by using the distance calculation formula. The predetermined position coordinate may be a position coordinate predetermined by a technician. As an example, the at least one preset position coordinate may be a position coordinate of a gate of a certain scenic spot, a position coordinate of a certain bus station, or a position coordinate of an autonomous vehicle station.

In some alternative implementations of the present embodiment, the execution body may further determine that a distance value smaller than a distance threshold is included in the distance value between the current position coordinate and the at least one preset position coordinate by first determining a minimum value of the distance between the current position coordinate and the at least one preset position coordinate. Here, the execution body may calculate the distance between the current position coordinate and each of the at least one position coordinate using the distance calculation formula. In this way, a minimum of at least one distance can be obtained. Then, if the minimum value is smaller than the set distance threshold, it can be determined that there is a distance value smaller than the distance threshold in the distance value between the current position coordinate and the at least one preset position coordinate.

In the present embodiment, after the execution body determines that there is a distance value smaller than the distance threshold value in the distance value between the current position coordinate and the preset at least one position coordinate, the to-be-played content can be selected from the sub-set of to-be-played content for content presentation by the presentation device. Here, the execution body may randomly select a set number of to-be-played content for presentation to the user. The execution body may alternatively select a set number of to-be-played contents, which is selected for a small number of times, for presentation to the user.

In some alternative implementations of the present embodiment, the execution body may alternatively select the to-be-played content from the sub-set of to-be-played contents as follows.

First, a position coordinate corresponding to a distance value smaller than a distance threshold is determined. Here, the execution body can directly obtain position coordinates corresponding to distance values smaller than the distance threshold value.

Second, the autonomous vehicle station information corresponding to the autonomous station matching the determined position coordinate in the autonomous vehicle driving route information is determined. In the present embodiment, the autonomous vehicle driving route information includes a set of autonomous vehicle station information corresponding to at least one autonomous station. The autonomous vehicle station information in the autonomous vehicle station information set includes, but is not limited to, a station name and a station position coordinate. The autonomous vehicle station may be a position point preset by a technician. In the present embodiment, the execution body may calculate the distance between the determined position coordinates and the station position coordinates in the respective autonomous vehicle station information, and may obtain at least one distance value. Then, the autonomous vehicle station corresponding to the station position coordinate having the minimum distance value is determined as the autonomous vehicle station matching the position coordinate corresponding to the minimum value. Thereafter, the autonomous vehicle station information of the autonomous vehicle station can be obtained.

Third, to-be-played content matching the autonomous vehicle station information is selected from the sub-set of to-be-played contents according to the determined autonomous vehicle station information. In this embodiment, the to-be-played content in the set of to-be-played contents is associated with station information. Here, the determined autonomous vehicle station information is compared with each to-be-played content in the sub-set of to-be-played contents, and if the station information associated with the to-be-played content matches the determined autonomous vehicle station information, the to-be-played content is selected. The station information associated with the to-be-played content matching the determined autonomous vehicle station information may refer to they are identical or corresponding. As an example, if the station information associated with the to-be-played content is the character "S", the determined autonomous vehicle station information is the character group "station", and the character "S" and the character group "station" represent a same station, the station information associated with the to-be-played content corresponds to the determined autonomous vehicle station information. In this case, the station information associated with the to-be-played content matches the determined autonomous vehicle station information.

In some alternative implementations of the present embodiment, the method for controlling the presentation of the content may further include the following steps.

First, manual play request information input by a user through a communicatively connected input device is received. The input device may be a keyboard, a mouse, or another device capable of inputting information. The manual play request information may be various information for requesting manual play of content. As an example, the manual play request information may be a character set "manu-play."

Second, for the to-be-played content in the sub-set of to-be-played contents, content category information of the to-be-played content is determined, and the determined content category information is stored in the content category information set in response to the absence of the determined content category information in the content category information set.

In the present embodiment, the to-be-played content in the sub-set of to-be-played contents is associated with content category information. The content category information may be various information for characterizing a category of to-be-played content. By way of example, the content category information may be the letter "M", and the category for characterizing the to-be-played content is music. In addition, the categories of the to-be-played content may be various categories preset by a technician. By way of example, categories of to-be-played content may include, but are not limited to, sports, music, education, tourism, food. In this embodiment, the execution body can directly obtain the content category information associated with the to-be-played content by using the to-be-played content. Then, the execution subject determines whether the obtained content category information is included in the content category information set, and if the obtained content category information is not included in the content category information set, stores the obtained content category information in the content category information set. On the contrary, if the obtained content category information is included in the content category information set, the obtained content category information is not stored in the content category information set. The content category information set is an empty set by default. It should be noted that the content category information of each to-be-played content in the sub-set of to-be-played contents is acquired and stored in the content category information set, so that the user can determine the played content by selecting the content category, thereby improving the video playing efficiency of the autonomous vehicle.

Third, the set of content category information is presented to the user through the presentation device.

In the present embodiment, the execution body may present the obtained content category information set to the user through the presentation device. The presentation device may be a sound box, may be a display screen, or may be another electronic device.

Fourth, selection request information input by the user through the communicatively connected input device is received, the selection request information including the content category information selected by the user, and the to-be-played content that matches the selected content category information is selected from the sub-set of to-be-played contents according to the selection request information.

In this embodiment, when receiving the selection request information input by the communicatively connected input device, the execution body may use the selected content category information to select the to-be-played content that matches the selected content category information from the to-be-played content sub-set.

Fourth, the to-be-played content is presented to the user through the presentation device.

In this embodiment, the execution body presents the to-be-played content corresponding to the content category selected by the user to the user, so that the video playing efficiency of the autonomous vehicle can be improved.

Figure 6:
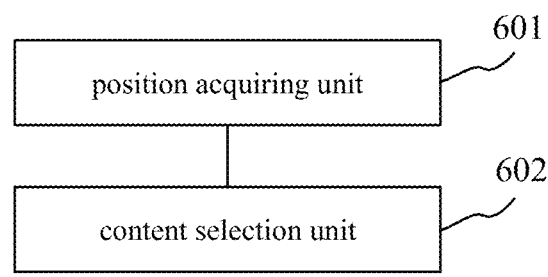
FIG. 6 is a schematic structural diagram of an embodiment of an apparatus for controlling presentation of content according to the present disclosure.

With continued reference to FIG. 6, as an implementation of the method shown in FIG. 5, the present disclosure provides an embodiment of an apparatus for controlling the presentation of content. The apparatus embodiment corresponds to the method embodiment shown in FIG. 5, and the apparatus can be specifically applied to various controllers.

As shown in FIG. 6, the apparatus 600 for controlling presentation of content in the present embodiment may include a position acquiring unit 601 configured to acquire a current position coordinate of an autonomous vehicle; a content selection unit 602 configured to, in response to determining that a distance value smaller than a distance threshold is included in the distance value between the current position coordinate and at least one preset position coordinate, select a to-be-played content from a sub-set of to-be-played contents for content presentation by a presentation device, where the sub-set of to-be-played contents is received from a communicatively connected server and the transmission of the sub-set of to-be-played content by the server includes determining vehicle information of an autonomous vehicle; selecting to-be-played content matching the vehicle information from a pre-stored set of to-be-played contents according to the vehicle information, and storing the selected to-be-played content to the sub-set of to-be-played contents; and transmitting the sub-set of to-be-played contents.

It will be appreciated that the units described in the apparatus 600 correspond to the steps in the method described with reference to FIG. 5. Thus, the features described above with respect to the method, as well as the resulting benefits, are equally applicable to the apparatus 600 and the units contained therein, and will not be further described herein.

Figure 7:
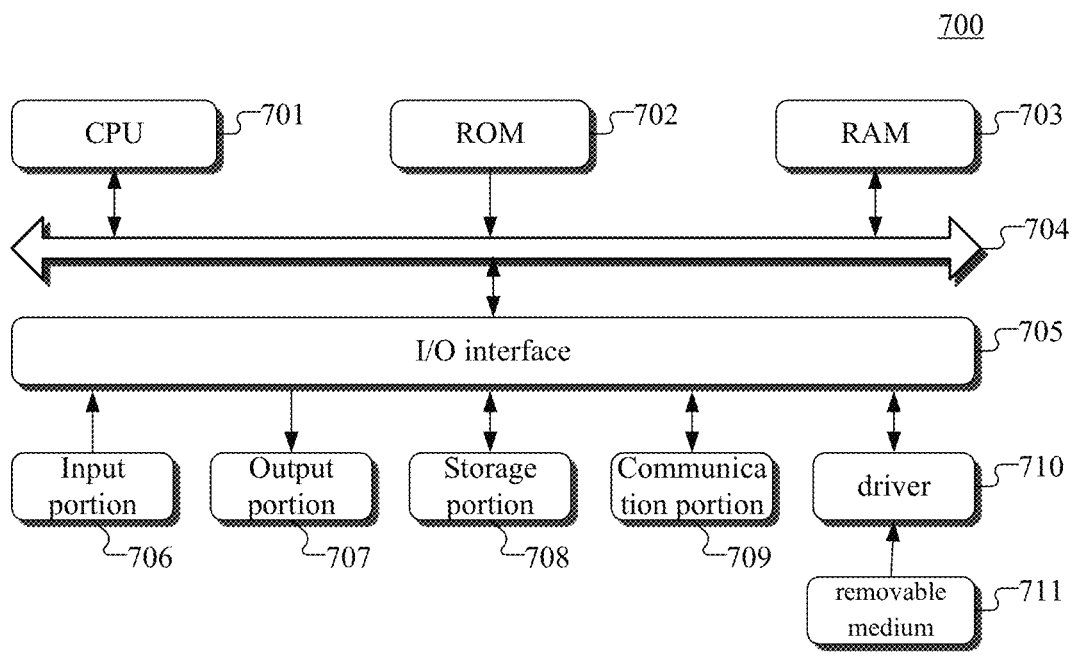
FIG. 7 is a schematic structural diagram of a computer system adapted for implementing a server according to an embodiment of the present disclosure.

Referring now to FIG. 7, there is shown a schematic structural diagram of a computer system 700 adapted for implementing a server of an embodiment of the present disclosure. The server shown in FIG. 7 is merely an example and should not impose any limitations on the functionality and scope of the embodiments of the present disclosure.

As shown in FIG. 7, the computer system 700 includes a central processing unit (CPU) 701, which may perform various appropriate actions and processes according to a program stored in a read-only memory (ROM) 702 or a program loaded into a random access memory (RAM) 703 from a storage portion 708. The RAM 703 also stores various programs and data required by operations of the system 700. The CPU 701, the ROM 702 and the RAM 703 are connected to each other through a bus 704. An input/output (I/O) interface 705 is also connected to the bus 704.

The following components are connected to the I/O interface 705: an input portion 706 including a keyboard, a mouse etc.; an output portion 707 including a cathode ray tube (CRT), a liquid crystal display device (LCD), a speaker etc.; a storage portion 708 including a hard disk and the like; and a communication portion 709 comprising a network interface card, such as a LAN card and a modem. The communication portion 709 performs communication processes via a network, such as the Internet. A driver 710 is also connected to the I/O interface 705 as required. A removable medium 711, such as a magnetic disk, an optical disk, a magneto-optical disk, and a semiconductor memory, may be installed on the driver 710, to facilitate the retrieval of a computer program from the removable medium 711, and the installation thereof on the storage portion 708 as needed.

In particular, according to embodiments of the present disclosure, the process described above with reference to the flow chart may be implemented in a computer software program. For example, an embodiment of the present disclosure includes a computer program product, which includes a computer program that is tangibly embedded in a machine-readable medium. The computer program includes program codes for executing the method as illustrated in the flow chart. In such an embodiment, the computer program may be downloaded and installed from a network via the communication portion 709, and/or may be installed from the removable media 711. The computer program, when executed by the central processing unit (CPU) 701, implements the above mentioned functionalities as defined by the methods of the present disclosure. It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. In the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, described as: a processor, including an information determination unit, an information storage unit, and an information transmission unit where the names of these units do not in some cases constitute a limitation to such units themselves. For example, the information determining unit may also be described as "a unit for determining the vehicle information of the communicatively connected autonomous vehicle, the vehicle information including the autonomous vehicle driving route information."

Figure 8:
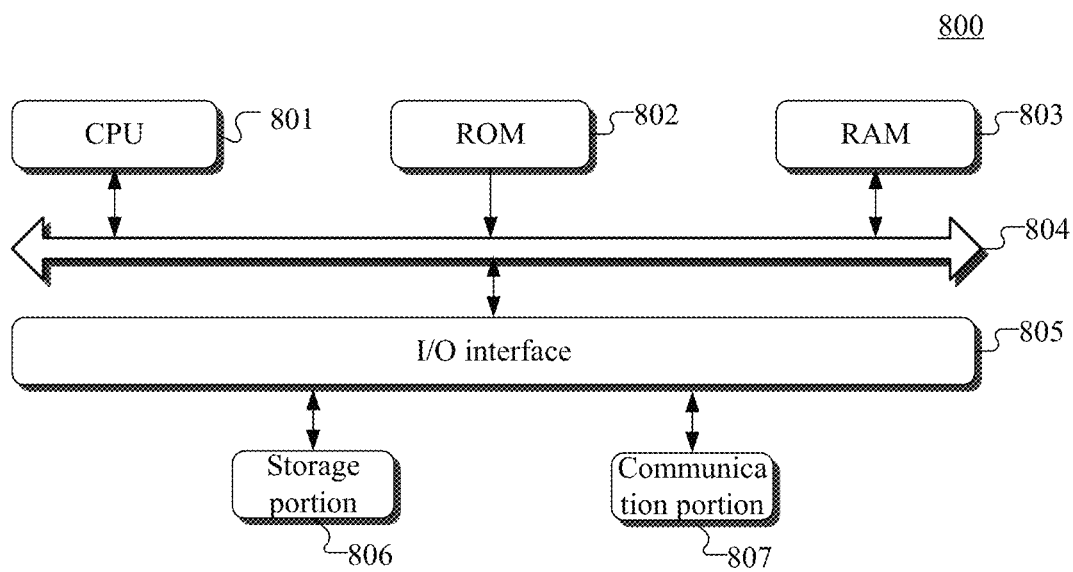
FIG. 8 is a schematic structural diagram of a computer system adapted for implementing a controller of an embodiment of the present disclosure.

Referring now to FIG. 8, there is shown a schematic structural diagram of a computer system 800 adapted for implementing a controller of an embodiment of the present disclosure. The controller shown in FIG. 8 is merely an example and should not impose any limitations on the functionality and scope of use of embodiments of the present disclosure.

As shown in FIG. 8, the computer system 800 may include a central processing unit (CPU) 801, which may perform various appropriate actions and processes according to a program stored in a read-only memory (ROM) 802 or a program loaded from a storage portion 806 into a random access memory (RAM) 803. In RAM 803, various programs and data required for the operation of the system 800 are also stored. CPU 801, ROM 802, and RAM 803 are connected to each other via bus 804. An input/output (I/O) interface 805 is also connected to bus 804.

The following components are connected to the I/O interface 805: a storage portion 806 including a hard disk or the like; and a communication portion 807 including a LAN card, a modem, or the like. The communication section 807 performs communication processing via a network such as the Internet.

It should be noted that the controller may a stand-alone controller or may be arranged in an autonomous vehicle. When the controller is arranged in the autonomous vehicle, the function may be integrated in a processor of a control system of the autonomous vehicle. In this case, an input portion including a sensor, a radar, a GPS, or the like, an output portion including a liquid crystal display (LCD), a speaker, or the like, and a motor driver may also be connected to the I/O interface 805 as required. The motor driver may drive the mobile device to complete the movement of the autonomous vehicle according to the control information sent by the CPU. The driver is also connected to the I/O interface 805 as desired. A removable medium, such as a magnetic disk, an optical disk, a magneto-optical disk, a semiconductor memory, or the like, may be mounted on the driver as required so that a computer program read therefrom is installed to the storage portion 806 as required. As a result, when the central processing unit (CPU) 801 invokes the computer program to execute the function of controlling the autonomous vehicle, the input portion is controlled to acquire the current position coordinates of the autonomous vehicle from the outside.

In another aspect, the present disclosure further provides a computer readable medium. The computer readable medium may be the computer readable medium included in the apparatus in the above described embodiments, or a stand-alone computer readable medium not assembled into the apparatus. The computer readable medium stores one or more programs. The one or more programs, when executed by a device, cause the device to: determine vehicle information of an communicatively connected autonomous vehicle, the vehicle information including autonomous vehicle driving route information; select to-be-played content matching the vehicle information from the pre-stored set of to-be-played contents according to the vehicle information, and storing the selected to-be-played content to the sub-set of to-be-played contents; and transmit the sub-set of to-be-played contents to the autonomous vehicle so that the autonomous vehicle plays the to-be-played content in the sub-set of to-be-played contents.

Further, when the one or more programs are executed by the apparatus, the apparatus may be further caused to: acquire the current position coordinate of the autonomous vehicle; in response to determining that a distance value smaller than a distance threshold is included in the distance value between the current position coordinate and the at least one preset position coordinate, select a to-be-played content from a sub-set of to-be-played contents for content presentation by a presentation device, where the sub-set of to-be-played contents is received from a communicatively connected server and is transmitted by the server by: determining vehicle information of an autonomous vehicle; selecting to-be-played content matching the vehicle information from the pre-stored set of to-be-played contents according to the vehicle information, and storing the selected to-be-played content to the sub-set of to-be-played contents; and transmitting a sub-set of to-be-played contents.

The above description is only a preferred embodiment of the application and a description of the technical principles employed. It should be understood by those skilled in the art that the scope of the invention referred to in this application is not limited to the technical solutions formed by specific combinations of the above-mentioned technical features, but also covers other technical solutions formed by any combination of the above-mentioned technical features or equivalents thereof without departing from the inventive concept. For example, the above-mentioned features and the technical features having similar functions disclosed in the present disclosure are replaced with each other.

What is claimed is:

1. A method for pushing information, comprising:
   determining vehicle information of a communicatively connected autonomous vehicle, the vehicle information including autonomous vehicle driving route information and vehicle type information, wherein the autonomous vehicle driving route information includes a set of autonomous vehicle station information corresponding to at least one autonomous vehicle station;
   selecting, from a pre-stored set of to-be-played contents, to-be-played content matching both the autonomous vehicle station information in the set of autonomous vehicle station information and the vehicle type information, and storing the selected to-be-played content to a sub-set of to-be-played contents, wherein the to-be-played content in the pre-stored set of to-be-played content is associated with autonomous vehicle station information and vehicle type information; and
   transmitting the sub-set of to-be-played contents to the autonomous vehicle, so that the autonomous vehicle plays the to-be-played content in the sub-set of to-be-played contents.

2. The method of claim 1, wherein
   the determining vehicle information of a communicatively connected autonomous vehicle comprises:
   receiving route formulation request information of the autonomous vehicle, wherein the route formulation request information comprises autonomous vehicle identification information, start point information, and end point information of the autonomous vehicle; and
   determining autonomous vehicle type information of the autonomous vehicle according to the autonomous vehicle identification information, and determining autonomous vehicle driving route information of the autonomous vehicle according to the start point information and the end point information.

3. The method of claim 1, wherein an autonomous vehicle station is a preset position point, the autonomous vehicle station information comprising a station name and station location coordinates.

4. The method of claim 1, wherein the selecting to-be-played content matching the vehicle information from a pre-stored set of to-be-played contents according to the vehicle information, and storing the selected to-be-played content to the sub-set of to-be-played contents comprises:
   finding at least one to-be-played content matching the autonomous vehicle type information from the set of to-be-played contents according to the autonomous vehicle type information; and
   for the autonomous vehicle station information in the autonomous vehicle station information set, selecting to-be-played content that matches the autonomous vehicle station information from the at least one to-be-played content, and storing the selected to-be-played content to the sub-set of to-be-played contents.

5. A method for controlling presentation of content, comprising:
   obtaining a current position coordinate of an autonomous vehicle;
   in response to determining that a distance value smaller than a distance threshold is included in a distance value between the current position coordinate and at least one preset position coordinate, selecting to-be-played content from a sub-set of to-be-played contents for content presentation by a presentation device, wherein the sub-set of to-be-played contents is received from a communicatively connected server and is transmitted by the server by: determining vehicle information of the autonomous vehicle, the vehicle information including autonomous vehicle driving route information and vehicle type information, wherein the autonomous vehicle driving route information includes a set of autonomous vehicle station information corresponding to at least one autonomous vehicle station; selecting, from a pre-stored set of to-be-played contents, to-be-played content matching both the autonomous vehicle station information in the set of autonomous vehicle station information and the vehicle type information, and storing the selected to-be-played content to a sub-set of to-be-played content, wherein the to-be-played content in the pre-stored set of to-be-played content is associated with autonomous vehicle station information and vehicle type information; and transmitting the sub-set of to-be-played content.

6. The method of claim 5, wherein the at least one preset position coordinate comprises at least one of a position coordinate of a gate of a scenic spot, a position coordinate of a bus station, or a position coordinate of an autonomous vehicle station.

7. The method of claim 5, wherein the determining that a distance value smaller than a distance threshold is included in a distance value between the current position coordinate and at least one preset position coordinate comprises:
   determining a minimum value of the distance between the current position coordinate and the at least one preset position coordinate; and
   determining that there is the distance value smaller than the distance threshold in the distance value between the current position coordinate and the at least one preset position coordinate, in response to determining that the minimum value is smaller than the distance threshold.

8. The method of claim 5, wherein the selecting to-be-played content matching the vehicle information from a pre-stored set of to-be-played contents according to the vehicle information comprises:
   determining a position coordinate corresponding to the distance value smaller than the distance threshold;
   determining autonomous vehicle station information corresponding to an autonomous station matching the determined position coordinate, the autonomous vehicle station information being included in the vehicle information; and
   selecting to-be-played content matching the autonomous vehicle station information from the sub-set of to-be-played contents according to the determined autonomous vehicle station information.

9. A controller comprising:
   one or more processors;
   a storage apparatus storing one or more programs,
   wherein the one or more programs when executed by the one or more processors cause the one or more processors to implement the method of claim 5.

10. An autonomous vehicle comprising the controller of claim 9.

11. A server comprising:
    one or more processors;
    a storage apparatus storing one or more program,
    wherein the one or more programs when executed by the one or more processors cause the one or more processors to perform operations, the operations comprising:
    determining vehicle information of a communicatively connected autonomous vehicle, the vehicle information including autonomous vehicle driving route information and vehicle type information, wherein the autonomous vehicle driving route information includes a set of autonomous vehicle station information corresponding to at least one autonomous vehicle station;

selecting, from a pre-stored set of to-be-played contents, to-be-played content matching both the autonomous vehicle station information in the set of autonomous vehicle station information and the vehicle type information, and storing the selected to-be-played content to a sub-set of to-be-played contents, wherein the to-be-played content in the pre-stored set of to-be-played content is associated with autonomous vehicle station information and vehicle type information; and transmitting the sub-set of to-be-played contents to the autonomous vehicle, so that the autonomous vehicle plays the to-be-played content in the sub-set of to-be-played contents.

12. The server of claim 11, wherein the determining vehicle information of a communicatively connected autonomous vehicle comprises:

receiving route formulation request information of the autonomous vehicle, wherein the route formulation request information comprises autonomous vehicle identification information, start point information, and end point information of the autonomous vehicle; and determining autonomous vehicle type information of the autonomous vehicle according to the autonomous vehicle identification information, and determining autonomous vehicle driving route information of the autonomous vehicle according to the start point information and the end point information.

13. The server of claim 11, wherein an autonomous vehicle station is a preset position point, the autonomous vehicle station information comprising a station name and station location coordinates.

14. The server of claim 11, wherein the selecting to-be-played content matching the vehicle information from a pre-stored set of to-be-played contents according to the vehicle information, and storing the selected to-be-played content to the sub-set of to-be-played contents comprises:

finding at least one to-be-played content matching the autonomous vehicle type information from the set of to-be-played contents according to the autonomous vehicle type information; and for the autonomous vehicle station information in the autonomous vehicle station information set, selecting to-be-played content that matches the autonomous vehicle station information from the at least one to-be-played content, and storing the selected to-be-played content to the sub-set of to-be-played contents.

* * * * *